Fig. 1.

July 1, 1958 A. J. WERNER 2,841,305
AUTOMATIC TAPING MECHANISMS
Filed March 5, 1956 8 Sheets-Sheet 2

Fig.2.

INVENTOR.
Arnold J. Werner,
BY Morsell & Morsell
Attys.

July 1, 1958 A. J. WERNER 2,841,305
AUTOMATIC TAPING MECHANISMS
Filed March 5, 1956 8 Sheets-Sheet 7

INVENTOR.
Arnold J. Werner,
BY
Morsell & Morsell
Attys.

United States Patent Office 2,841,305
Patented July 1, 1958

2,841,305

AUTOMATIC TAPING MECHANISMS

Arnold J. Werner, Elm Grove, Wis., assignor to Wagner Iron Works, Milwaukee, Wis., a corporation of Wisconsin Application March 5, 1956, Serial No. 569,615

2 Claims. (Cl. 216—29)

This invention relates to improvements in automatic taping mechanisms, and more particularly to a mechanism for automatically applying predetermined lengths of sealing tape to the closed flaps of cartons or packages which travel through the tape applying mechanism.

It is an accepted practice to package certain commodities in cartons or boxes formed of fibrous material including those materials commonly known as fiberboard, kraft, corrugated board, and the like. Many types of canned and bottled goods are shipped in the aforementioned type of cartons which will hereinafter be referred to broadly by the term "fiberboard," which cartons are customarily rectangular in shape and are provided with foldable cover flaps forming extensions of the side and end walls thereof. It is customary, after the carton is filled, to fold the end flaps of the carton inwardly toward each other into a common plane and to thereafter fold the side cover flaps inwardly toward each other and into contact with the upper surfaces of the folded-in cover flaps. The carton is subsequently sealed by either gluing the folded side cover flaps to the end cover flaps or by applying a strip of gummed tape longitudinally along the meeting edges of the folded-over side cover flaps and extending the tape down the end walls of the carton into adhesive contact therewith.

A primary object of the present invention is to provide an automatic taping mechanism which will apply a longitudinally directed strip of tape to the top and portions of the ends of a carton or package being progressed through the taping mechanism for the purpose of sealing the carton closure flaps in down-folded condition or for sealing the package.

A further object of the invention is to provide an improved automatic taping mechanism adapted for installation in conventional conveyor line setups or in certain flap gluing equipment to replace the gluing mechanism therein.

A further object of the invention is to provide an automatic taping mechanism which includes an automatic tape dispenser which will feed from a source a predetermined length of tape, moisten the adhesive thereon when desired, feed the strip of tape into the path of the carton or package to be taped, and then sever the tape in a length which equals the length of the package to be taped, plus twice the length of the wipe-down strip required for application to both ends of the package.

A further object of the invention is to provide an automatic taping mechanism having a tape applying device which forces the tape down along the top of the package to be taped and longitudinally thereof and wipes down the extended end portions of the strip of tape onto the ends of the package.

A further object of the invention is to provide an automatic taping mechanism which is adjustable to adapt it to packages or cartons of various dimensions, which will automatically dispense a predetermined length of tape for each carton or package passing through the mechanism, which is adjustable to vary the amount of tape dispensed for packages of various lengths, which is expeditious and efficient in its operation, which is strong and durable, and which is well adapted for the purposes described.

With the above and other objects in view, the invention consists of the improved automatic taping mechanism, and its parts and combinations as set forth in the claims, and all equivalents thereof.

In the accompanying drawings in which the same reference characters indicate the same parts in all of the views.

Figure 1:
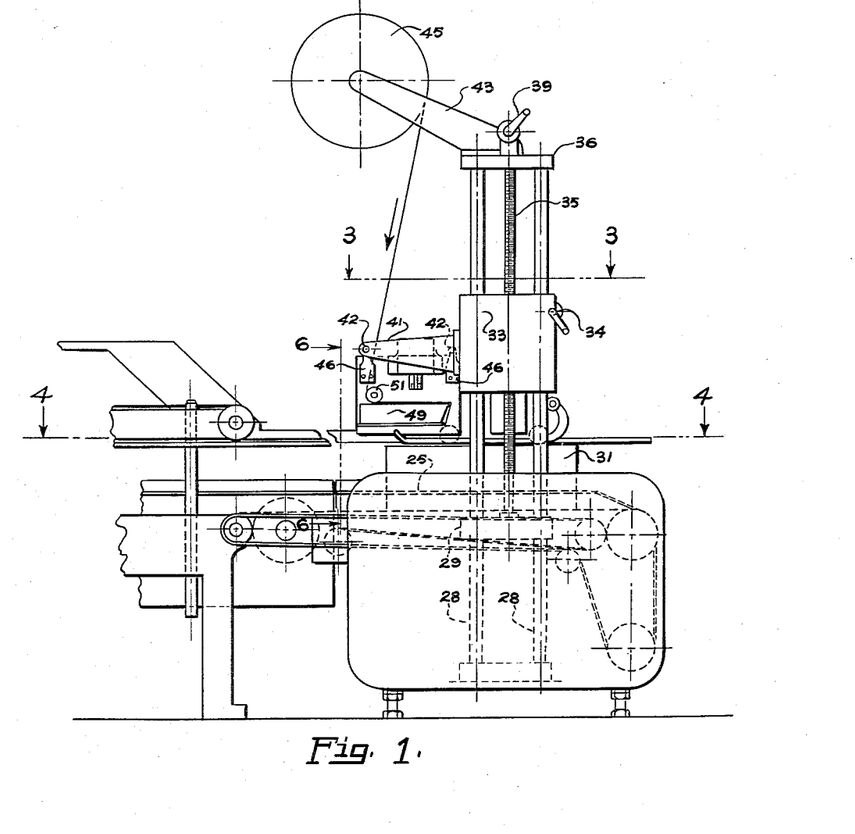
Fig. 1 is a side view of that portion of a machine which includes the improved automatic taping mechanism mounted over a carton conveyor.
Figure 2:
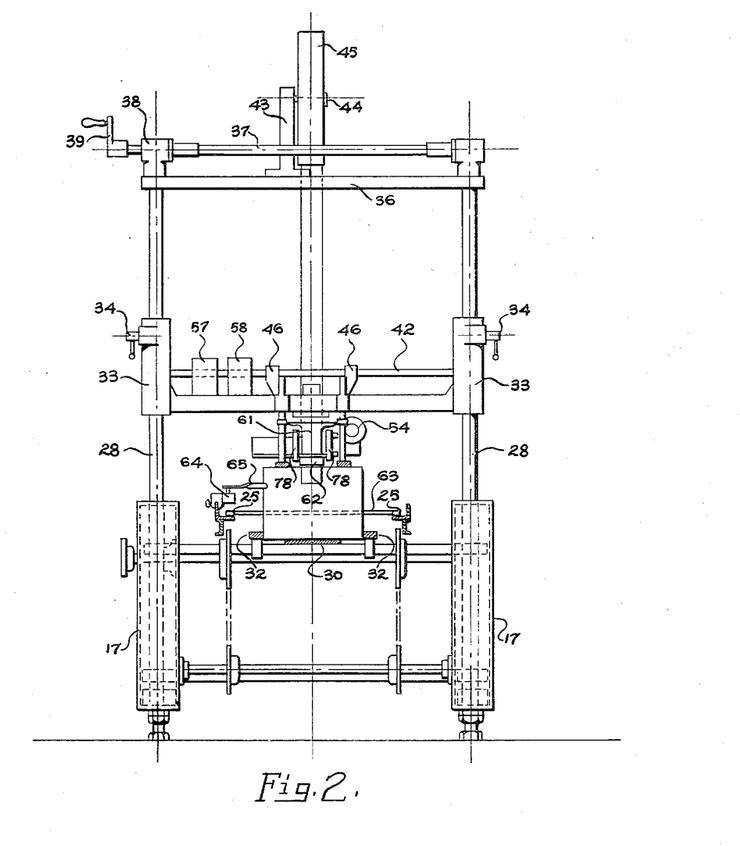
Fig. 2 is a front end view of the mechanism shown in Fig. 1 with portions of the carton or package conveyor in section.
Figure 3:
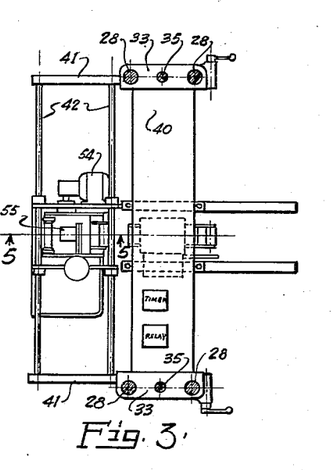
Fig. 3 is a fragmentary horizontal sectional view taken on the line 3—3 of Fig. 1.

The improved taping machine shown generally in Figs. 1 and 2 is adapted for installation on any standard carton gluing machine or in association with a carton or package conveyor, the conveyor being of the standard endless chain type and being designated 25. The improved mechanism can apply tape to the top and portions of the ends of cartons or packages of varying lengths within certain limits. While the machine is in operation the conveyor 25 is constantly operating to progress the line of packages or cartons through the tape applying mechanism and no special spacing of the longitudinally aligned cartons is required.

Essentially the improved taping mechanism includes two instrumentalities which comprise the tape strip dispensing and severing mechanism generally indicated by the numeral 26 in Figs. 5, 6, 7 and 8; and the tape strip wipe-down mechanism designated generally by the numeral 27 in Figs. 9–12 inclusive which illustrate the preferred form of wipe-down mechanism. However, an alternative form of wipe-down mechanism designated 26' is shown in Figs. 13–16 inclusive, and a second alternative form of tape strip wipe-down mechanism designated generally by the numeral 27" is shown in Figs. 17–20 inclusive.

Along the longitudinal path of travel of the conveyor 25 and carried by frame members 17 are pairs of vertical posts of columns 28. Extending transversely between the spaced pairs of posts or columns 28 and secured at its opposite ends thereto is a frame separator plate 29 whose intermediate portion carries a conveyor plate 30 on which the cartons or packages 31 to be taped ride between transversely adjustable side rails 32. Mounted for vertical sliding movement on the columns 28 intermediate the ends of the same are adjustable side frame members 33 which can be held in a desired vertically adjusted position by tightening locking bolts 34. Adjustment of the members 33 on the columns 28 is accomplished by vertical screws 35 which are threaded through the members 33 and have their lower ends mounted in thrust bearings in the separator plate 29. The upper ends of the screws 35 extend through a transverse top plate 36 and are in geared connection with a transverse shaft 37 mounted in suitable bearings 38 on the top frame plate 36. One end portion of the transverse shaft 37 carries a hand crank 39 and manipulation of the latter becomes effective through the shaft 37 and its geared connection with the screws 35 to turn the screws in a desired direction to thereby raise or lower the side frame members and all parts carried thereby. Extended between and carried by the side frame members 33 is a transverse bridge 40. Carried by the inner vertical faces of the side frame members 33 are supporting arms 41 to which are secured in spaced relation opposite extremities of a pair of spaced supporting rods 42. The rods 42 in association with the side frame members 33 provide an adjustable support for the tape dispensing unit.

Extending upwardly and rearwardly from the top transverse plate 36 is a bracket arm 43 carrying a stub shaft 44 on which is mounted for rotation a tape supply roll 45. An extent of tape is adapted to be drawn from the supply roll 45 downwardly between the arms 41.

The transverse supporting rods 42 have depending therefrom hangers 46 (see particularly Figs. 5 and 6) to which a pair of depending plates 47 are secured which carry a base plate 48 on which is supported, among other things, an L-shaped water fountain 49, in an offset portion of which extends a vertical plate 50 having a recessed upper edge in which is journaled a tape guide roller 51. The extent of tape from the roll 45 is directed under the guide roller 51 and between a pair of knurled feed rollers 52 and 53.

Suitable supporting brackets for an electric motor 54 are carried by the plate 47. The motor drive shaft is connected through gears (not shown) with the shaft on which the tape feed roller 53 is mounted and when tape is extended between the feed rollers 52 and 53 and the motor 54 is in operation, a suitable extent of tape will be advanced. Selective operation of the motor 54 and hence the feed rollers 52 and 53 is accomplished by means of a standard push type solenoid switch 55 which is in electrical connection with a limit switch 56 (see wiring diagram) which is adjacent a side of the conveyor and is actuated by a relay switch 57 and timing switch 58. The limit switch is operated by contact with a portion of a package or carton passing toward the taping mechanism and is released when the package progresses therebeyond. Hence the tape dispensing mechanism through the means described and the longitudinal adjustability of the switch 56 will dispense a predetermined length of tape suitable for a package of any desired length, the length of the tape desired ordinarily being the length of the top of the package plus equal extents for wipe-down at each end of the package (approximately 2½" at each end).

Within the tape moistening fountain 49 is mounted a brush 59 (see Fig. 5) which obtains water from the fountain 49 by capillary action and over the outer moistened end of which the advanced extent of tape 45 extends, so that its under-gummed surface will be suitably moistened to a slight degree on its gummed undersurface. Adjacent the moistening brush 59 the extended strip of tape passes under a weight 60 suitably spaced from the brush which insures correct but light contact of the tape with the moistening brush. Then the tape engages a surface of a deflector plate 61 and passes against a surface portion of a depending spring-urged pressure roller 62 which is effective to insure proper application of the tape to the desired surface portion of the box or carton 31 passing thereadjacent in cooperation with the wipe-down mechanism as will hereinafter be described. As will also be explained hereinafter, the tape wipe-down mechanism is effective to wipe down the front extent of the tape strip onto the front end of the carton or package and to roll the tape firmly onto the top of the package longitudinally thereof as the package advances forwardly, and to finally wipe down the end extent of the tape after the desired length of tape has been severed from the supply onto the rear end of the package. However, the severance of the strip of tape in the desired length through means hereinafter to be described takes place after the package has been progressed by the conveyor beyond the taping station.

As the tape is first adhered to the front and then progressively to the top of the package the progress of the package advances the tape strip and the severance of the latter by the knife takes place after the front and top of the package have had the tape applied thereto and just before the rear end of the tape strip is wiped down onto the rear end of the package.

Figure 4:
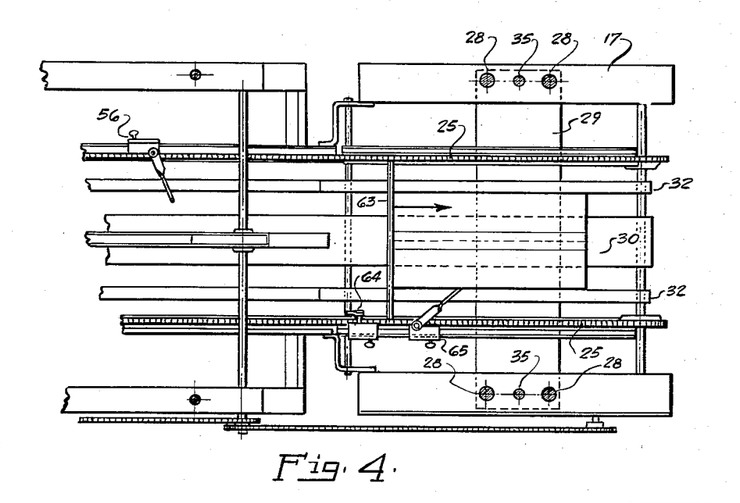
Fig. 4 is a fragmentary horizontal sectional view taken on line 4—4 of Fig. 1.
Figure 5:
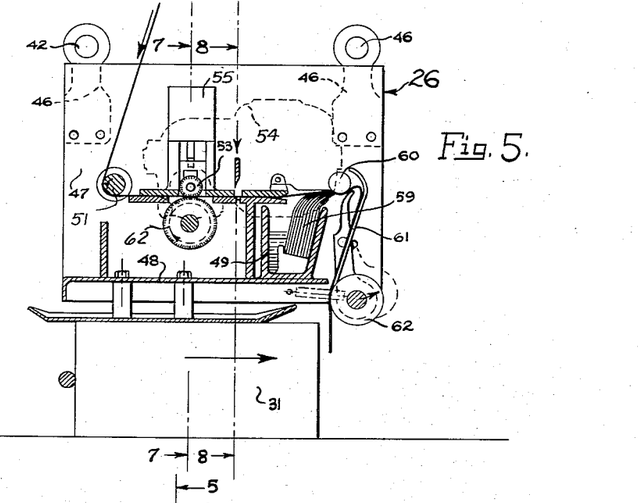
Fig. 5 is an enlarged sectional view taken on line 5—5 of Fig. 3.
Figure 6:
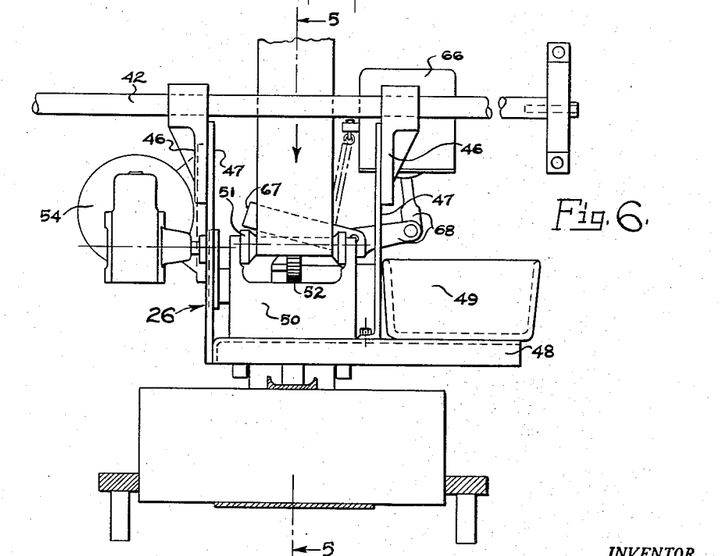
Fig. 6 is an enlarged fragmentary detail sectional view taken approximately along the line 6—6 of Fig. 1.
Figure 7:
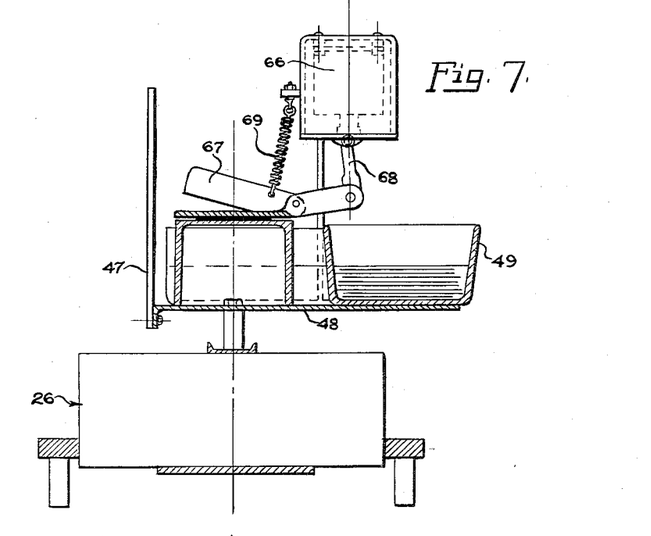
Fig. 7 is an enlarged fragmentary detail sectional view taken along the line 7—7 of Fig. 5 to illustrate the tape-severing knife.
Figure 8:
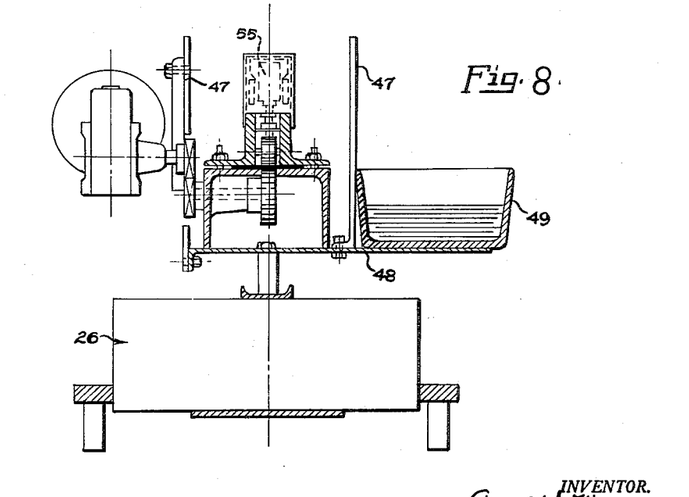
Fig. 8 is an enlarged fragmentary detail sectional view taken along the line 8—8 of Fig. 5 to illustrate the feed roll mechanism for the tape.

As is standard in the type of mechanism or gluer with which the improved taping machine is utilized, there are, between the conveyor chains 25 and carried thereby at spaced intervals, cartonf pusher bars 63 (see Figs. 2 and 4). In actual practice these pusher bars are spaced apart a sufficient distance to accommodate therebetween the longest carton or package which the machine may handle. Assuming that a package or a carton is being pushed through the tape applying station the pusher bar 63 immediately engaging the rear of the carton will ultimately contact a limit switch 64 which has associated therewith a carton-contacting operating lever 65 with the result that when the package 31 passes free of the lever 65 the switch 64 will energize a solenoid 66 to oscillate a pivotally mounted knife 67 under which the tape passes before it reaches the moistening fountain 49. This takes place after the desired length of tape has been advanced and partially applied to the package.

Interposed between the oscillatory scissors type knife 67 and the solenoid 66 are operating links 68 and an anchored spring 69 extending to the knife normally holds the knife in raised inoperative position when the solenoid in de-energized. Obviously progression of a carton beyond the lever 65 will cause enrgization of the solenoid 66 and a cutting operation of the knife 27. This severs the tape to the desired length which is the length of the carton or package being taped plus extra wipe-down extents for both ends of the carton. The completely taped carton then is advanced beyond the taping mechanism, and the latter will automatically repeat its operations in respect to successive cartons being advanced by the conveyor.

Figure 12:
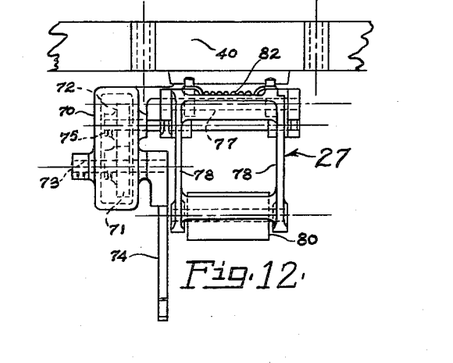
Fig. 12 is a front view of the showing in Fig. 11.

Immediately forward of the tape dispensing mechanism and depended from the transverse bridge 40 is a flat housing or casing 70 which in the principal form of the invention and according to Figs. 9–12, inclusive, houses a pair of meshing gears 71 and 72. The shaft 73 on which the gear 71 is mounted also has fast thereon the hub portion of a downwardly forwardly directed lever 74 which is in the path of and adapted to be contacted by the front end portion of a package or carton 31 to which tape is to be applied. The arrangement is such that the lever 74 normally hangs in the position of Fig. 11 and the contact by the front end of the carton or package 31 pivots the lever upwardly in a counter-clockwise direction to the position of Fig. 9. This pivotal movement of the lever 74, through the shaft 73 turns the large gear 71 in the direction of the arrow in Fig. 11 which causes a reverse turning movement of the gear 72. The latter is fast on a shaft 75 which also has secured thereon one end portion of a link 76. The opposite end portion of the link 76 is revolubly mounted on a shaft 77 on which is journaled the upper ends of a pair of connected front wipe-down arms 78 and the upper ends of a pair of connected rear wipe-down arms 79, the arms of both pairs being complementarily curved toward one another. The lower ends of the front wipe-down arms 28 carry a revoluble shaft on which is mounted a front wipe-down roller 80 and the lower ends of the rear wipe-down arms 79 revolubly carry a shaft on which is mounted a rear wipe-down roller 81. A torsion spring 82 (see Fig. 12 is connected at one end to an upper portion of the rear wipe-down arms 79 and at the other end to an upper portion of the front wipe-down arms 78 with the result that the spring normally causes the wipe-down arms 78 and 79 to assume the relatively contracted or closed condition of Fig. 11. Also, the link 76 is yieldingly held in a raised position by a spring 83 connected between an intermediate portion of the link and a portion of the bridge 40.

Figures 9, 10:
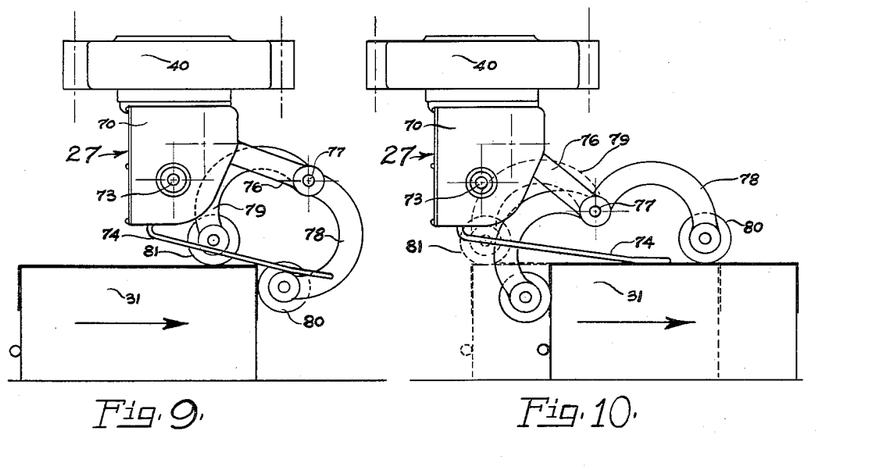
Fig. 9 is a semi-schematic view of the preferred form of tape wipe-down arms and rollers in relation to the front end portion of a carton being taped.
Fig. 10 is a similar view, only showing the wipe-down arms and rollers in position for the wipe-down of tape along the rear end of a carton.
Figure 11:
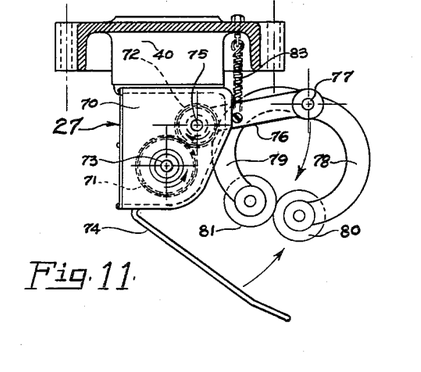
Fig. 11 is a side view, partly in section, of the preferred form of tape wipe down unit.

When the lever 24 is engaged by the advancing carton 31 and raised to the position of Fig. 9, through the gears 71 and 72 the outer end of the link 76 will be dropped somewhat so as to engage the roller 80, carried by the front wipe-down arms 78 with a front end portion of the advancing carton 31 to wipe down the front extent of the tape strip onto the front end of the carton, and as the carton further advances the wipe-down arms and rollers 30 and 81 will be further spread, resulting in the condition shown in Fig. 10, and while this condition exists the rear wipe-down roller 81 presses the longitudinal horizontal extent of the tape onto the top of the carton throughout the length thereof. When the rear end of the carton moves beyond the rear wipe-down roller 81 it will snap against the rear end of the carton and roll or wipe the rear depending extent of tape onto a portion of the rear of the carton. Obviously when the carton further progresses and is out of contact with the wipe-down arms and lever 74, the position of Fig. 11 will ensue until the lever 74 is contacted by the next carton in the series.

A modified form of tape wipe-down unit is illustrated in Figs. 13 to 16 inclusive. There, the inner ends of the rear wipe-down arms 79' are mounted below the inner end of a link 76' to which is pivotally attached the inner ends of the front wipe-down arms 78' so that a greater spread as between the arms 78' and 79' is attainable than in connection with the arms of the wipe-down unit of Figs. 9 to 12 inclusive. This modified form of wipe-down unit includes a carton operated lever 74' mounted on the shaft 73' which carries the gear 71' meshing with a smaller gear 72' fast on a shaft carrying the inner end of the link 76' so that pivotal movement of the lever 74', through the gears 71' and 72' is effective to swing the link 76' and drop the front wipe-down arms 78' to spread the same relative to the rear wipe-down arms 79' and to wipe down a tape extent at the front end of the package 31 by means of the front roller 80'.

A spring 84 is adjustably carried by a shaft 85 anchored between portions of the rear arms 79' and the forward arms 78'. Also, there is a torsion spring $81^2$ extended between upper end portions of the arms 78' and 79' and a spring 83' anchored between the link 76' and the frame 40 to yieldingly hold the link and arms in the inactive position of Fig. 15.

Figure 13:
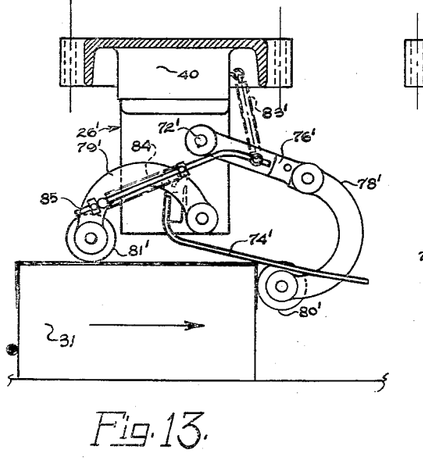
Fig. 13 is a semi-schematic view of a modified form of wipe down unit in position to wipe down the tape on the front end of a carton passing through the machine.
Figure 14:
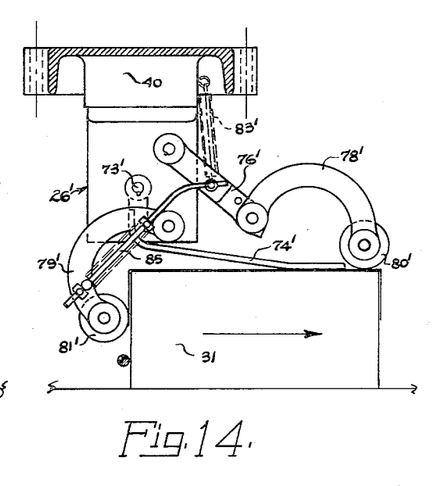
Fig. 14 is a view similar to Fig. 13, only showing the wipe-down unit in a different position of operation with one of the arms and rollers wiping down a tape extent at the rear end of the box.
Figure 15:
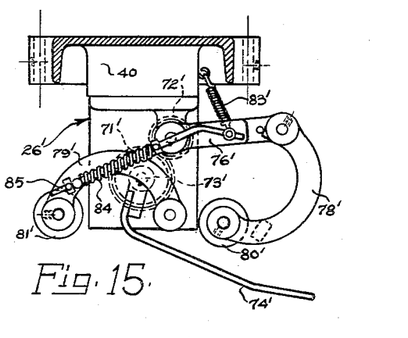
Fig. 15 is a side view partly in section of the modified wipe-down unit of Figs. 13 and 14.
Figure 16:
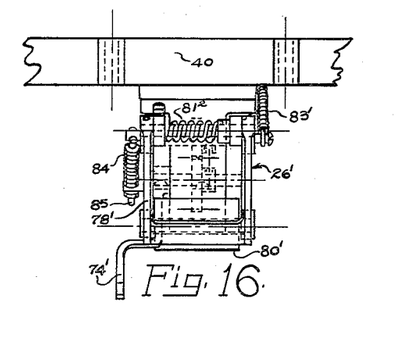
Fig. 16 is a front view of the showing in Fig. 15.

It will be obvious that as the carton 31 to which the tape is being applied progresses forwardly, the wipe-down arms and rollers change from the arrangement of Fig. 13 to the arrangement of Fig. 14 to wipe down the tape along the top of the carton and along the rear end, following the application of the extent of tape to the front end of the carton.

Figures 17, 18, 19, 20, 22:
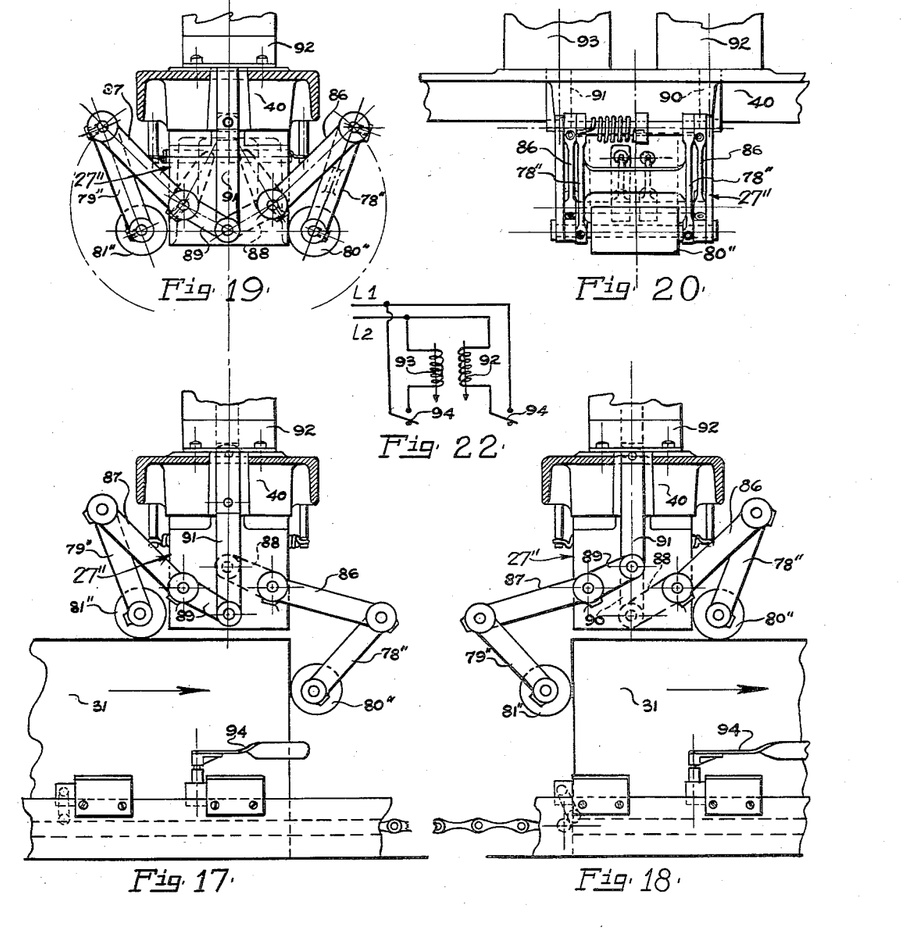
Fig. 17 is a semi-schematic side view of a second modified form of wipe-down unit in which the arms are independent and are solenoid operated.
Fig. 18 is a view similar to Fig. 17, only showing the arms of the wipe-down unit in a different position of operation.
Fig. 19 is a side view partly in section of the second modified form of wipe-down unit.
Fig. 20 is a front view of the showing of Fig. 19.
Fig. 22 is a wiring diagram of the switches and solenoids used for operation of the wipe-down arms of Figs. 17 to 20 inclusive.
Figure 21:
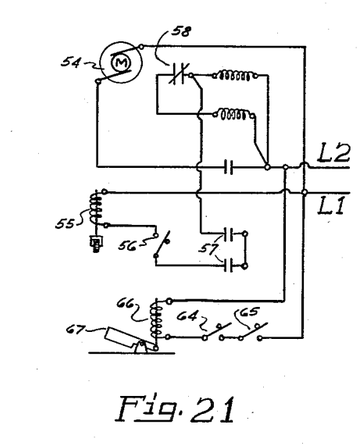
Fig. 21 is a wiring diagram of the electrically controlled elements of the mechanism.

A second modified form of wipe-down unit is illustrated in Figs. 17 to 20, inclusive. In this form of the invention the front and rear arms 78" and 79" respectively are pivotally connected at their upper ends to links 86 and 87, respectively, and the inner ends of the latter are pivotally connected by links 88 and 89 to the plungers 90 and 91 of electrically operated front arm and rear arm solenoids 92 and 93 respectively. When said solenoids are de-energized the plungers 90 and 91 are in the position of Fig. 19 holding the wipe-down arms 78" and 79" in an inoperative position. Carton-operated switches 94 electrically connected with the solenoids (see Fig. 22) are carried by the machine adjacent the path of travel of the conveyor 25 and cartons 31. When the forward switch 94 is engaged by the front end of the progressing carton to be taped, the front arm solenoid 92 will be energized to raise its plunger 90 permitting the front arms 78" to assume the position of Fig. 17 wherein the front roller 80" may wipe down the front end of the tape extent onto the front of the carton. Further forward progress of the carton causes the front arms 78" and links 86 to jackknife with the roller 80" wiping down the tape along the top of the carton until the condition of Fig. 18 is reached at which time energization of the rear arm solenoid 93 through a carton operated switch 94 will raise the plunger 91 and permit the roller on the rear arms 79" to snap against the rear of the carton and apply the rear extent of tape thereto.

From the foregoing description it will be understood that the improved automatic taping mechanism includes two instrumentalities, namely the tape dispensing mechanism which automatically dispenses a strip of tape for each progressing carton or package to be taped, and severs it in a predetermined length at the proper time, and the tape wipe-down mechanism which applies the predetermined length of tape to the top of the progressing carton or package and to portions of the ends thereof. The several mechanisms are adjustable and adaptable to cartons of varying dimensions and operate automatically and expeditiously.

The improved automatic taping mechanism, besides being adaptable to various machines which include carton conveyors, is relatively simple and is well adapted for the purposes described.

What is claimed as the invention is:

1. In a taping machine having a conveyor for continuously moving a succession of cartons longitudinally through the machine and having a tape supply roll; an electric motor operated unitary tape strip dispensing and severing mechanism mounted at a fixed location over the path of travel of the conveyor; said mechanism being operative to extend from the roll a tape strip of predetermined greater length than the longitudinal dimension of the carton and direct it lengthwise of the moving carton; switch means for said motor operated mechanism controlled by the forward progression by the conveyor of a carton to be taped; said tape strip dispensing and severing mechanism including means for pulling a predetermined extent of tape from the supply roll and positioning it longitudinally of the top of the carton for progressive application to the top and the front end of the carton while it is being advanced by the conveyor and finally to the rear end of the carton; said mechanism including means for severing the tape strip in a predetermined length before it is completely directed to the carton and applied to the rear end thereof.

2. In a taping machine having a conveyor for moving a succession of cartons longitudinally through said machine and having means for applying tape to the front end, top, and rear end of each carton as it advances through said machine, said machine having a tape supply roll; a unitary tape strip dispensing and severing mechanism mounted at a fixed station over the path of travel of the conveyor; switch means controlled by the forward progression by the conveyor of the carton to be taped, said tape strip dispensing and severing mechanism including means for pulling a predetermined extent of tape from the supply roll and positioning it longitudinally of the top of the carton for progressive application to the top and front end of the travelling carton and finally to the rear end of the travelling carton, said mechanism including means for severing the extent of tape from the supply roll before it is completely fed to the carton and also including movably mounted arms for applying the strip of tape to the carton; and arm operating means, operation of the latter being initiated by the moving carton.

References Cited in the file of this patent

UNITED STATES PATENTS

| | | |
|---|---|---|
| 2,052,903 | Stagmeier | Sept. 1, 1936 |
| 2,540,694 | Sieg | Feb. 6, 1951 |
| 2,574,181 | Hess | Nov. 6, 1951 |
| 2,575,887 | Nitchie | Nov. 20, 1951 |
| 2,653,727 | Wagner et al. | Sept. 29, 1953 |
| 2,787,396 | Christensson | Apr. 2, 1957 |
| 2,799,419 | Scherb | July 16, 1957 |